United States Patent
Phan et al.

(10) Patent No.: US 11,823,076 B2
(45) Date of Patent: Nov. 21, 2023

(54) TUNING CLASSIFICATION HYPERPARAMETERS

(71) Applicant: International Business Machines Corporation, Armonk, NY (US)

(72) Inventors: Dung Tien Phan, Pleasantville, NY (US); Hongsheng Liu, Chapel Hill, NC (US); Lam Nguyen, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 16/939,577

(22) Filed: Jul. 27, 2020

(65) Prior Publication Data

US 2022/0027757 A1     Jan. 27, 2022

(51) Int. Cl.
  *G06N 5/04*     (2023.01)
  *G06N 20/00*    (2019.01)
  *G06F 16/28*    (2019.01)

(52) U.S. Cl.
  CPC .............. *G06N 5/04* (2013.01); *G06F 16/285* (2019.01); *G06N 20/00* (2019.01)

(58) Field of Classification Search
  CPC ......... G06N 5/04; G06N 20/00; G06F 16/285
  See application file for complete search history.

(56) References Cited

U.S. PATENT DOCUMENTS

| | | | |
|---|---|---|---|
| 9,665,791 B2 * | 5/2017 | Straub | G06T 7/77 |
| 10,360,517 B2 * | 7/2019 | Koch | G06N 5/01 |
| 10,963,802 B1 * | 3/2021 | Gardner | G06N 20/20 |

(Continued)

FOREIGN PATENT DOCUMENTS

| | | |
|---|---|---|
| CN | 108062587 A | 5/2018 |
| CN | 108573281 A | 9/2018 |

(Continued)

OTHER PUBLICATIONS

Simon Bernard, Elsevier, Pattern Recognition, Oct. 2015, pp. 46-60 (previously furnished to Applicant as "Bernard").*

(Continued)

*Primary Examiner* — Michael I Ezewoko
(74) *Attorney, Agent, or Firm* — Randy Tejeda

(57) ABSTRACT

In an approach to hyperparameter optimization, one or more computer processors express a hyperparameter tuning process of a model based on a type of model, one or more dimensions of a training dataset, associated loss function of the model, and associated computational constraints of the model, comprising: identifying a set of optimal hyper-rectangles based a calculated local variability and a calculated best function value; calculating a point as a representative for each identified potentially optimal hyper-rectangle by locally searching over the identified set of potentially optimal hyper-rectangles; dividing one or more hyper-rectangles in the identified set of optimal hyper-rectangles into a plurality of smaller hyper-rectangles based on each calculated point; and calculating one or more optimal hyperparameters utilizing a globally converged hyper-rectangle from the plurality of smaller hyper-rectangles. The one or more computer processors classify one or more unknown datapoints utilizing the model associated with tuned hyperparameters.

20 Claims, 11 Drawing Sheets

(56) References Cited

U.S. PATENT DOCUMENTS

| | | | |
|---|---|---|---|
| 11,093,833 B1 * | 8/2021 | Gardner | G06N 3/126 |
| 11,544,630 B2 * | 1/2023 | Karnagel | G06N 3/045 |
| 11,593,704 B1 * | 2/2023 | Jenatton | G06F 16/958 |

FOREIGN PATENT DOCUMENTS

| | | | |
|---|---|---|---|
| CN | 109816116 A | 5/2019 | |
| CN | 110770764 A | 2/2020 | |
| CN | 111105040 A | 5/2020 | |
| DE | 202019105282 U1 | 12/2019 | |
| KR | 102107378 B1 | 5/2019 | |
| WO | 2015184729 A1 | 12/2015 | |

OTHER PUBLICATIONS

Dipti Jasrasaria, arXiv:1807.01279v1, Jul. 2018, pp. 1-8 (previously furnished to Applicant as "Bernard").*
"StepDIRECT: A Derivative-Free Optimization Method for Stepwise Functions", Printed Jun. 25, 20, 10 pages.
Anonymous Authors, "Bayesian Direct", Printed Jun. 25, 20, 7 pages.

* cited by examiner

Algorithm: StepDIRECT

Define $c_1 = (0.5, \ldots, 0.5) \in R^p$ and set $x_{min} = c_1$, $f_{min} = f(c_1)$, $k = m = 1$ Run the Initialization Step to get $P_1$, $I_1$, $C_1$, $f_i$ ($\forall i \in P_1$), $f_{min}$ and $x_{min}$ while $m \leq f_{eval}^{max}$ do

Identify the set S of all potentially optimal hyper-rectangles in $P_k$ (see FIG. 7 )

for $j \in S$ do a) (Optional) Perform a local search over $H_j$ (see FIG. 8 )

b) Identify the sides of the rectangle $H_j$ and divide $H_j$ into smaller hyper-rectangles along these directions (see Equation 10 and Item 47 )

c) Evaluate $f$ at centers of new hyper-rectangles d) Update $f_{min}$, $X_{min}$, and m end for

Update $P_k$, $I_k$, $C_k$, $f_i$ ($\forall i \in P_k$)

Update $k = k + 1$ end while

FIG. 4

Algorithm: Local Search

Given starting point $x \in B$, $\delta \in [\delta_{min}, \delta_{max}]$, $0 < \theta < 1 < \phi$, $f_{eval}^{max}$.

Initialize $m = 0$, $x_{min} = x$, and $f_{min} = f(x)$.

while $m < f_{eval}^{max}$ do

Randomly generate search directions D $S = \mathrm{argmin}_{d \in D} \{f(x + \delta d) : x + \delta d \in B\}$ Randomly sample $d^* \in S$ and define $f^* = f(x + \delta d^*)$ if $f^* > f_{min}$ then

$\delta \leftarrow \min\{\phi\delta, \delta_{max}\}$ else if $f^* > f_{min}$ then

$\delta \leftarrow \max\{\theta\delta, \delta_{min}\}$ end if

$x \leftarrow x + \delta d^*$ end if

Update $f_{min}$, $x_{min}$, and $m$ end while return $f_{min}$, $x_{min}$, $m$ and feasible sampled points with their function values

FIG. 8

| DATA SET | BOSTON | DIABETES | MPG | BODYFAT |
|---|---|---|---|---|
| n | 506 | 768 | 234 | 252 |
| p | 13 | 8 | 11 | 14 |

FIG. 9

| ALGORITHMS | | BOSTON | DIABETES | MPG | BODYFAT |
|---|---|---|---|---|---|
| DIRECT | OBJVAL<br>TIME | 32.60 (± 0.00)<br>8.21 (± 0.01) | 77.66 (± 0.00)<br>9.14 (± 0.06) | 10.55 (± 0.00)<br>1.52 (± 0.04) | 1.31 (± 0.00)<br>6.15 (± 0.02) |
| StepDIRECT-0 | OBJVAL<br>TIME | 28.66 (± 0.00)<br>7.59 (± 0.01) | 75.8 (± 0.00)<br>9.41 (± 0.16) | 10.37 (± 0.00)<br>1.66 (± 0.09) | 1.27 (± 0.00)<br>6.03 (± 0.03) |
| StepDIRECT | OBJVAL<br>TIME | 28.35 (± 0.02)<br>9.77 (± 0.23) | 58.68 (± 1.04)<br>10.74 (± 0.15) | 9.85 (± 0.03)<br>2.88 (± 0.20) | 1.26 (± 0.01)<br>8.55 (± 0.03) |
| DE | OBJVAL<br>TIME | 28.40 (± 0.08)<br>15.22 (± 0.79) | 69.71 (± 1.72)<br>23.86 (± 0.45) | 9.82 (± 0.01)<br>8.85 (± 0.70) | 1.29 (± 0.01)<br>3.34 (± 0.29) |
| PSO | OBJVAL<br>TIME | 28.41 (± 0.08)<br>30.60 (± 0.49) | 80.55 (± 3.82)<br>34.67 (± 11.91) | 9.87 (± 0.06)<br>34.47 (± 0.88) | 1.28 (± 0.05)<br>29.49 (± 0.14) |
| RBFOpt | OBJVAL<br>TIME | 28.56 (± 0.02)<br>14.70 (± 2.85) | 87.34 (± 3.82)<br>11.95 (± 1.17) | 10.40 (± 0.00)<br>8.70 (± 0.08) | 1.33 (± 0.04)<br>12.83 (± 1.83) |

FIG. 10

| DATASET (#CLASS) | RS | DIRECT | StepDIRECT | BO |
|---|---|---|---|---|
| SYNTHETIC (3) | 74.75% | 75.25% | 76.85% | 75% |
| PenDigits (10) | 94.0% | 94.2% | 95.8% | 94.9% |
| MNIST (10) | 91.3% | 91.8% | 93.4% | 92.0% |

FIG. 11

| DATASET (#CLASS) | RS | DIRECT | StepDIRECT | BO |
|---|---|---|---|---|
| SYNTHETIC (3) | 74.5% | 75.25% | 75.5% | 75.5% |
| PenDigits (10) | 94.8% | 95.0% | 96.8% | 95.1% |
| MNIST (10) | 92.02% | 92.2% | 92.7% | 92.3% |

FIG. 12

| DATASET | p | n | n_/n+ |
|---|---|---|---|
| FOURCLASS | 2 | 862 | 1.8078 |
| DIABETES | 8 | 768 | 1.8657 |
| GERMAN | 24 | 1000 | 2.3333 |
| SV MGUIDE3 | 22 | 1243 | 3.1993 |
| IJCNN1 | 22 | 35000 | 9.2643 |

FIG. 13

| DATASET | RS | GS | DIRECT | StepDIRECT | BO |
|---|---|---|---|---|---|
| DIABETES | 79.8% | 81.2% | 79.2% | 81.8% | 81.8% |
| FOURCLASS | 100.0% | 80.9% | 100.0% | 100.0% | 100.0% |
| GERMAN | 77.5% | 78.5% | 80.5% | 81.5% | 81.0% |
| SV MGUIDE3 | 83.5% | 83.9% | 84.3% | 84.3% | 82.9% |
| IJCNN1 | 97.6% | 98.3% | 94.6% | 98.2% | 98.3% |

TUNING CLASSIFICATION HYPERPARAMETERS

BACKGROUND

The present invention relates generally to the field of machine learning, and more particularly to tuning hyperparameters.

In machine learning, a hyperparameter is a configuration that is external to the model and whose value cannot be estimated from data. Hyperparameters are used in processes to help estimate model parameters. Hyperparameter are set before the learning (e.g., training) process begins. By contrast, the values of other parameters are derived via training. Different model training algorithms require different hyperparameters, some simple algorithms, such as ordinary least squares regression, require none. Given a set of hyperparameters, a training algorithm learns the parameter values from the data. For instance, least absolute shrinkage and selection operator (LASSO) is an algorithm that adds a regularization hyperparameter to ordinary least squares regression, required to be set before estimating the parameters through the training algorithm. Similar machine learning models can require different hyperparameters (e.g., different constraints, weights, or learning rates) to generalize different data patterns.

Derivative-free optimization has a long history and can be traced back to generalized deterministic direct-search (DDS) method. Subsequently, many variants of DDS have been proposed, including the generalized pattern-search (GPS) method, DIRECT, and the mesh adaptive direct search (MADS) method. In addition, evolution strategy is a class of DFO that are heuristic search procedures inspired by natural evolution, including the differential evolution (DE) and the covariance matrix adaptation evolution strategy (CMA-ES). Another important class of DFO is the local model-based methods in which the updates are based primarily on the predictions of a model that serves as a surrogate of the objective function or of a related merit function. For instance, RBFOpt utilizes the radial basis function as the surrogate model. The name DIRECT comes from the shortening of the phrase "DIviding RECTangles", which describes the way the algorithm partitions the feasible domain by a number of hyper-rectangles in order to move towards the optimum. An appealing feature of DIRECT is that it is insensitive to discontinuities and does not rely on gradient estimate. These characteristics are nicely suitable for a stepwise function. In the literature, a number of variants of DIRECT algorithms have been proposed for a general objective function a very few of them have been successful to exploit the problem structure. For example, some have introduced an efficient modification of DIRECT to optimize a symmetric function by including an ordered set in the hyper-rectangle dividing step.

SUMMARY

Embodiments of the present invention disclose a computer-implemented method, a computer program product, and a system for hyperparameter optimization utilizing spatial-partitioning derivative-free optimization and a stochastic local search algorithm for stepwise functions. The computer-implemented method includes one or more computer processors expressing a hyperparameter tuning process of a model based on a type of model, one or more dimensions of a training dataset, associated loss function of the model, and associated computational constraints of the model, comprising: one or more computer processors identifying a set of optimal hyper-rectangles based a calculated local variability and a calculated best function value; one or more computer processors calculating a point as a representative for each identified potentially optimal hyper-rectangle by locally searching over the identified set of potentially optimal hyper-rectangles; one or more computer processors dividing one or more hyper-rectangles in the identified set of optimal hyper-rectangles into a plurality of smaller hyper-rectangles based on each calculated point; calculating one or more optimal hyperparameters utilizing a globally converged hyper-rectangle from the plurality of smaller hyper-rectangles. The one or more computer processors classify one or more unknown datapoints utilizing the model associated with tuned hyperparameters.

BRIEF DESCRIPTION OF THE DRAWINGS

FIG. 4 is an exemplary algorithm, in accordance with an embodiment of the present invention;

FIG. 8 is an exemplary algorithm, in accordance with an embodiment of the present invention;

FIG. 9 is an exemplary table, in accordance with an embodiment of the present invention;

FIG. 10 is an exemplary table, in accordance with an embodiment of the present invention;

FIG. 11 is an exemplary table, in accordance with an embodiment of the present invention;

FIG. 12 is an exemplary table, in accordance with an embodiment of the present invention;

FIG. 13 is an exemplary table, in accordance with an embodiment of the present invention;

FIG. 14 is an exemplary table, in accordance with an embodiment of the present invention;

DETAILED DESCRIPTION

Figure 1:
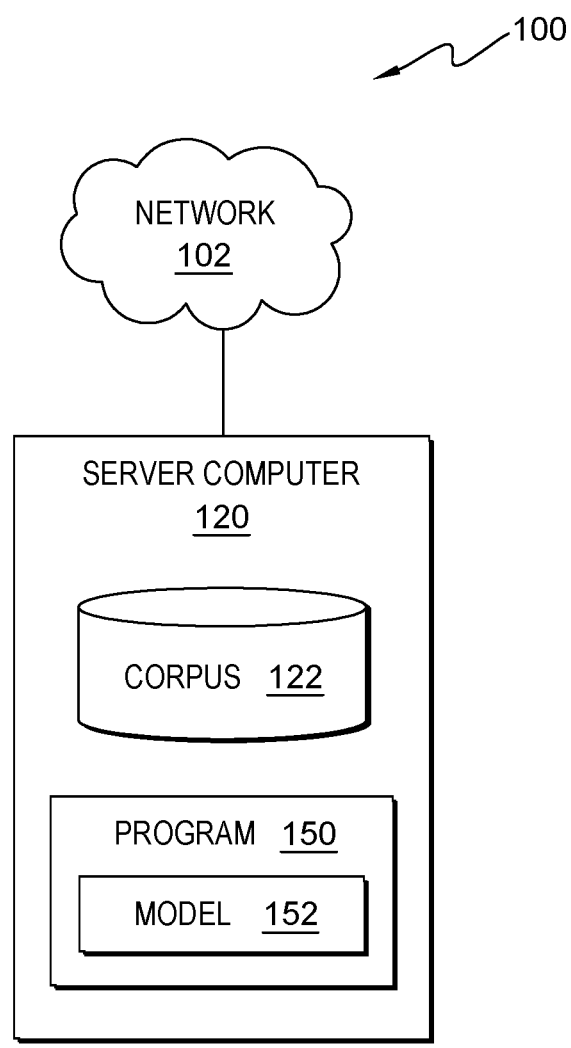
FIG. 1 is a functional block diagram illustrating a computational environment, in accordance with an embodiment of the present invention.

In machine learning models, practitioners often need to choose a number of hyper-parameters to get a high prediction accuracy for unseen samples. For example, in training L1-regularized logistic regression classifier practitioners can tune the sparsity parameter. Traditionally, to have a good generalization property for new instances (e.g., data points) which the model has not yet seen, practitioners split the entire dataset into three subsets: training data, validation data, and testing data. For a given set of hyper-parameters, practitioners train the model on the training data, then evaluate the model performance on the testing/validation data. Some commonly used metrics include accuracy, precision, recall, F1-score, and AUC (Area Under the Curve). The goal is to tune hyper-parameters for the model to maximize the performance on the validation data. Traditionally, practitioners utilize gradients (e.g., gradient descent) and Hessian to tune hyperparameters as the model is trained and validated. It is often observed in many applications that computing the gradient and the Hessian of the objective function of is not possible (e.g., gradients are either zero or undefined). Hence, there is no useful derivative information available to do gradient-based optimization due to the constant and discontinuous structure of a stepwise function. Traditionally, function evaluations and turning are costly and noisy which increases computational costs (e.g., computational requirements (e.g., time and system specifications)) associated with training machine learning models.

Embodiments of the present invention propose a spatial-partitioning derivative-free optimization (DFO) program and algorithm in which $f$ is viewed as a black-box function whose function value can only be evaluated point-wisely. Embodiments of the present invention utilize the proposed spatial-partitioning derivative-free optimization for tree ensemble regression optimization. Embodiments of the present invention utilize the proposed spatial-partitioning derivative-free optimization for hyperparameter tuning for classification models. Embodiments of the present invention identify and select hyper-rectangles to partition and sample new points. Embodiments of the present invention do not to compute approximate gradients or build a surrogate objective function as in many common methods. Embodiments of the present invention provide a new criterion for selecting potentially optimal hyper-rectangles using the local variability and the best function value. Embodiments of the present invention propose a new stochastic local search algorithm specially designed for stepwise functions, resulting in a stochastic sampling global optimization algorithm. Embodiments of the present invention introduce a stochastic feature to the algorithm in order to escape from a local minimum. Embodiments of the present invention improve over general DFO approaches by utilizing a different heuristic to select which hyper-rectangle to split, which takes into account the local function variability; and utilizing a local search (randomized directional search) to choose a high-quality point as a representative for each hyper-rectangle. Embodiments of the present invention propose a spatial partition global algorithm to identify an optimal solution under a computational budget constraint. Embodiments of the present invention recognize that computational costs and requirements associated with training a model are reduced through optimizing associated hyperparameters with the embodiments stated above. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes corpus 122 and program 150. In other embodiments, server computer 120 may contain other applications, databases, programs, etc. which have not been depicted in computational environment 100. Server computer 120 may include internal and external hardware components, as depicted and described in further detail with respect to FIG. 16.

Corpus 122 is a repository for data used by program 150. In the depicted embodiment, corpus 122 resides on server computer 120. In another embodiment, corpus 122 may reside elsewhere within computational environment 100 provided program 150 has access to corpus 122. A database is an organized collection of data. Corpus 122 can be implemented with any type of storage device capable of storing data and configuration files that can be accessed and utilized by program 150, such as a database server, a hard disk drive, or a flash memory. In an embodiment, corpus 122 stores data used by program 150, such as one or more examples, sets of training data, data structures, and/or variables used to fit the parameters of a specified model. The contained data comprises of pairs of input vectors with associated output vectors. In an embodiment, corpus 122 may contain one or more sets of one or more instances of unclassified or classified (e.g., labelled) data, hereinafter referred to as training statements. In another embodiment, the training data contains an array of training statements organized in labelled training sets. For example, a plurality of training sets includes "positive" and "negative" labels paired with associated training statements (e.g., words, sentences, etc.). In an embodiment, each training set includes a label and an associated array or set of training statements which can be utilized to train one or more models. In an embodiment, corpus 122 contains unprocessed training data. In an alternative embodiment, corpus 122 contains natural language processed (NLP) (e.g., section filtering, sentence splitting, sentence tokenizer, part of speech (POS) tagging, tf-idf, etc.) feature sets. In a further embodiment, corpus 122 contains vectorized (i.e., one-hot encoding, word embedded, dimension reduced, etc.) training sets, associated training statements, and labels. In an embodiment, corpus 122 stores historical hyperparameters and associated hyper-rectangles, where the hyperparameters for a model can be categorical, discrete or continuous.

Model 152 is representative of one or more machine learning models such as bi-label classifiers and/or multi-label classifiers. In an embodiment, model 152 is comprised of any combination of machine learning models, techniques, and algorithms (e.g., decision trees, Naive Bayes classification, support vector machines for classification problems, random forest for classification and regression, linear regression, least squares regression, logistic regression. In the depicted embodiment, model 152 is classification model. In another depicted embodiment, model 152 is a tree ensemble model such as a random forest or boosting tree. The training, deployment, and utilization of model 152 is depicted and described in further detail with respect to FIG. 2.

Program 150 is a program for hyperparameter optimization utilizing spatial-partitioning derivative-free optimization and a stochastic local search algorithm for stepwise functions (i.e., StepDIRECT). In an embodiment, program 150 iterates through one or more StepDIRECT (as detailed in FIG. 4) iterations, as discussed in flowchart 300. In an embodiment, StepDIRECT consists of applying spatial-partitioning derivative-free optimization to expressed hyperparameters tuning process by identifying a set of potentially optimal hyper-rectangles based on a new criterion, as described in step 302; local searching over the potentially optimal hyper-rectangles, as described in step 304; and dividing the selected hyper-rectangles into smaller hyper-rectangles, as described in 306. In various embodiments, program 150 may implement the following steps: expressing a hyperparameter tuning process of a model based on a type of model, one or more dimensions of a training dataset, associated loss function of the model, and associated computational constraints of the model, comprising: identifying a set of optimal hyper-rectangles based a calculated local variability and a calculated best function value; calculating a point as a representative for each identified potentially optimal hyper-rectangle by locally searching over the identified set of potentially optimal hyper-rectangles; dividing one or more hyper-rectangles in the identified set of optimal hyper-rectangles into a plurality of smaller hyper-rectangles based on each calculated point; and calculating one or more optimal hyperparameters utilizing a globally converged hyper-rectangle from the plurality of smaller hyper-rectangles; and classifying one or more unknown datapoints utilizing the model associated with tuned hyperparameters. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2 and FIG. 3.

The present invention may contain various accessible data sources, such as corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
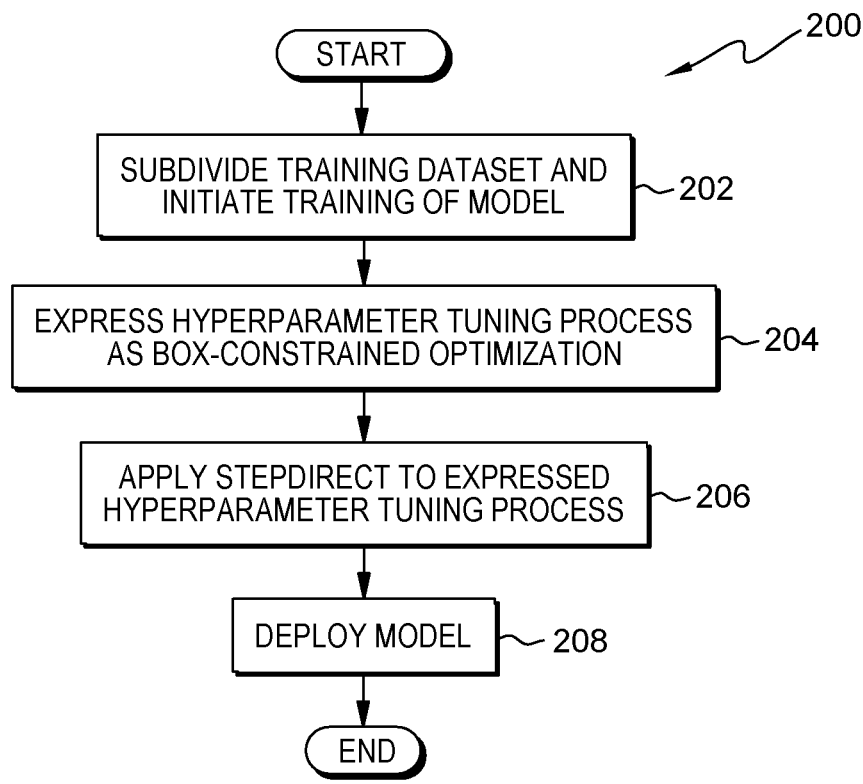
FIG. 2 is a flowchart depicting operational steps of a program, on a server computer within the computational environment of FIG. 1, for automated optimization of hyperparameters in machine learning classification models, in accordance with an embodiment of the present invention.

FIG. 2 depicts flowchart 200 illustrating operational steps of program for automated optimization of hyperparameters in machine learning classification models, in accordance with an embodiment of the present invention.

Program 150 subdivides training dataset and initiates training of model (step 202). In an embodiment, program 150 initiates responsively to a model training or retraining request, detection, or commencement. In an embodiment, program 150 responsively initiates a training or a re-training of a model (i.e., model 152). In an embodiment, program 150 partitions training data, associated information, and vectors, contained within corpus 122, into multiple training, testing, and validation sets. Dependent on the utilized training method (supervised vs unsupervised), said sets are classified, paired, associated, and/or linked with one or more labels or output vectors. In another embodiment, program 150 partitions training set data into discrete sets containing multiple versions of the same set and label. In yet another embodiment, program 150 constructs training subsets by identifying the scope of the associated label and segmenting the training data into discrete section, subject, or categorical sets. In various embodiments, program 150 non-deterministically divides the processed sets into training, validation, test sets. In a further embodiment, program 150 attaches a corresponding label to each constructed training set. In various embodiments, program 150 utilizes cross validation techniques, such as K-Fold cross validation, to create one or more testing and validation sets. In an embodiment, program 150 subdivides a training dataset into m training samples $\{(x_1, y_1), \ldots, (x_m, y_m)\}$ and n validation samples $\{(x_1, y_1), \ldots, (x_n, y_n)\}$ where $x_i \in \mathbb{R}^d$ and $y_i \in \{\pm 1\}$.

Program 150 expresses hyperparameter tuning process of the initiated model as a box-constrained optimization (step 204). In embodiment, program 150 expresses the hyperparameter tuning process of the initiated model based on the type of model, divided training dataset dimensions, associated loss function, and associated computational constraints. The hyperparameter turning process is a deterministic optimization process, such as:

$$\min f(x), x \in \Omega \qquad \qquad 1)$$

With respect to equation (1), $\Omega$ is a bounded hyper-rectangle, i.e., $\Omega = \{x \in \mathbb{R}^p : l \leq x \leq u\}$ for some given l, $u \in \mathbb{R}^p$. Some embodiments of the present invention assume that $\Omega = f$: $\mathbb{R}^p \rightarrow \mathbb{R}$ is a stepwise function, whose closed-form formula is unavailable or costly to get and store. In an embodiment, the hyperparameter tuning process begins optimization by transforming the domain of the problem linearly into the unit hyper-cube. In an embodiment, program 150 tunes hyperparameters associated with one or more models in order to maximize one or more performance measures such as accuracy. Here, program 150 determines a $\lambda$ that maximizes:

$$F_{accuracy}(\lambda) = \frac{1}{n}\sum_{i=1}^{n} I(h(x_i; \lambda) = y_i) \qquad \qquad 2)$$

With respect to equation (2), $I(\cdot)$ is the indicator function and $(x_i, y_i)$ is from the subdivided validation dataset, as detailed in step 202. It is plain to see that $$F_{accuracy}(\lambda) \in \left\{0, \frac{1}{n}, \ldots, \frac{n-1}{n}, 1\right\}$$

for any $\lambda$; hence this function is a stepwise function. In various embodiments, the target function for other metrics can also be interpreted as a stepwise function. In various embodiments, the hyperparameters for a model are categorical, discrete, or continuous. In an embodiment, program 150 utilizes a loss function associated with the type of model and subdivided training datasets to access model quality. For example, program 150 utilizes $\lambda^* = \mathrm{argmin}\, L(f(X_{train}; \lambda), X_{val}) : \lambda \in \Lambda$ to represent the tuning process as an optimization problem, where $f(\bullet; \lambda)$ is the machine learning algorithm parameterized by hyperparameters 1, $X_{train}$ is a training dataset, $X_{val}$ is a validation dataset, L is a loss function, and $\Lambda$ is the parameter search space.

Program 150 applies spatial-partitioning derivative-free optimization to expressed hyperparameters tuning process (step 206). Program 150 applies spatial-partitioning derivative-free optimization to expressed hyperparameters tuning process by identifying a set of potentially optimal hyper-rectangles based on a new criterion, as described in step 302; local searching over the potentially optimal hyper-rectangles, as described in step 304; and dividing the selected hyper-rectangles into smaller hyper-rectangles, as described in step 306. In an embodiment, program 150 expects that the sub-regions have a high chance to contain a global optimal solution. In various embodiments, program 150 repeats the steps listed above until global convergence is obtained, where program 150 converges to the globally optimal function value for the stepwise function $f$ over the bounded box, as detailed below in Theorem 1.

Program 150 deploys model (step 208). In an embodiment, program 150 selects the trained and hyperparameter optimized model, as described in step 206, and deploys said model to a production environment or server. In various embodiments, program 150 may select multiple ranked models and deploy the models to the same production environment or deploy the models to a plurality of respective production, test, or auxiliary environments. In another embodiment, program 150 determines which deployment environment to deploy a model out of a plurality of deployment environments (e.g., test, production, backup server, containers, or virtual machines). For example, if a model requires 20 gigabytes (i.e., computational constraint) of storage space to operate and a specified production environment only has 10 gigabytes available, then program 150 eliminates said production environment and selects an environment that can support said model. In an embodiment, the user instructs program 150 to deploy the model to a specific environment. In various embodiment, program 150 utilizes the optimized hyperparameters to train (i.e., transfer learning) other models in like problem domains. In another embodiment, program 150 utilizes the deployed model to classify one or more new or unknown datapoints.

Figure 3:
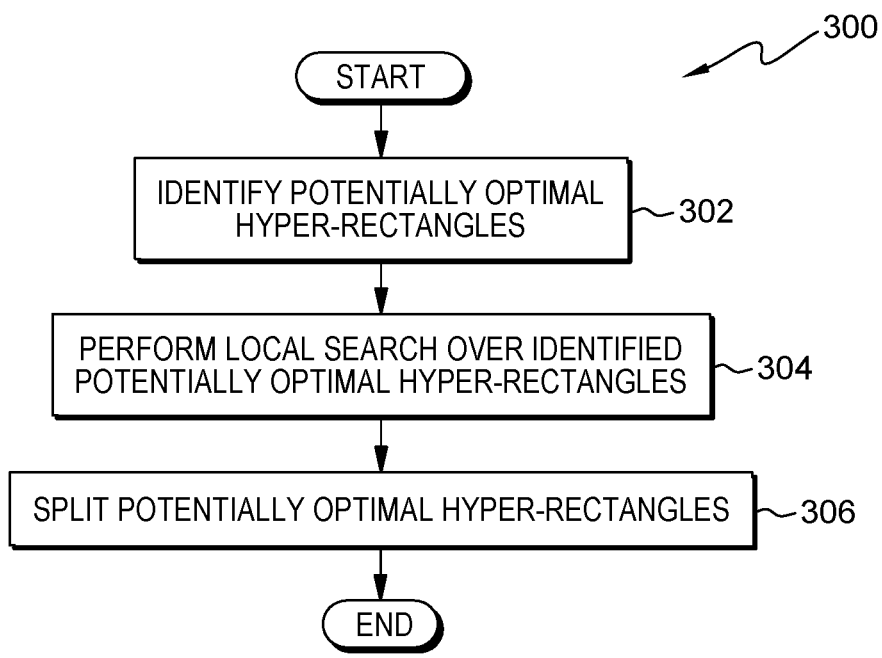
FIG. 3 is a flowchart depicting operational steps, on a server computer within the computational environment of FIG. 1, for derivative-free hyperparameter optimization, in accordance with an embodiment of the present invention.

FIG. 3 depicts flowchart 200 illustrating operational steps for derivative-free hyperparameter optimization, in accordance with an embodiment of the present invention.

Program 150 identifies potentially optimal hyper-rectangles (step 302). Program 150 calculates and identifies $P_k$ defining the set of the current hyper-rectangles associated with the index set $I_k$:

$$P_k = \{H_i : i \in I_k\} \qquad \qquad 3)$$

With respect to equation (3), where $H_i = \{x \in \mathbb{R}^p : 0 \leq l_i \leq x \leq u_i \leq 1\}$ is a hyper-rectangle in the partition. The set $C_k$ denotes the set of centers $C_k$ of hyper-rectangles in $P_k$. In an embodiment, program 150 denotes by $f_i$ the best function value of $f$ over $H_i$ by evaluating at the current sampled points in the sub-regions including its center $c_i$. In an embodiment, program 150 utilizes m to count the number of function evaluations and $f_{eval}^{max}$ is the maximal number of function evaluations.

In an embodiment, program 150 performs an initialization procedure starting with finding $f_1 = f(c_1)$ and dividing the hyper-cube n by evaluating the function values at 2p points $c_1 \pm \delta e_i$, $i \in [p] \triangleq \{1, \ldots, p\}$, where $\delta = \frac{1}{3}$ and $e_i$ is the i-th unit vector. In an embodiment, program 150 selects one or more hyper-rectangles with a small function value in a large search space; hence:

$$s_i = \min\{f(c_1 + \delta e_i), f(c_1 - \delta e_i)\}, i \in [p] \qquad \qquad 4)$$

Figure 5:
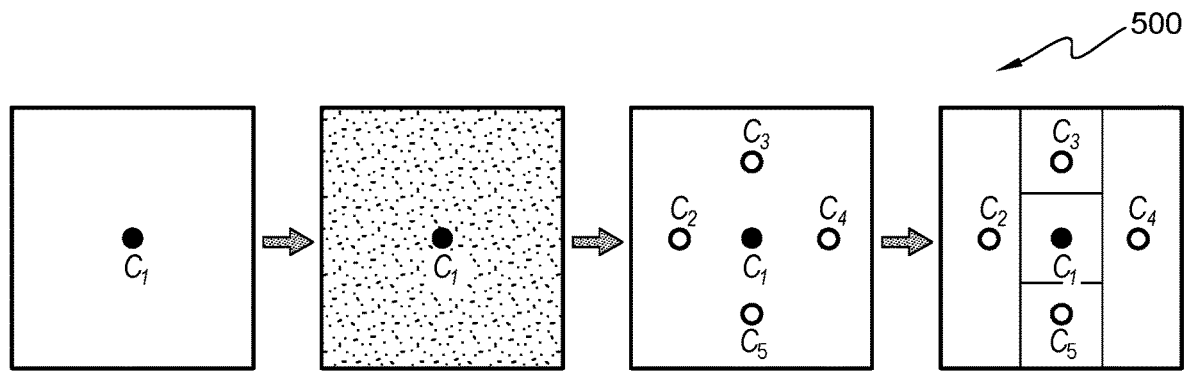
FIG. 5 is an example embodiment of the steps of flowchart 300, in accordance with an embodiment of the present invention.

In an embodiment, program 150 partitions the dimension with the smallest $s_i$ into thirds. By doing so, $c_1 \pm \delta e_i$ are the center of the newly generated hyper-rectangles. Some embodiments of the present invention initialize the sets $P_1$, $I_1$, $C_1$, values $f_i$ for every $i \in P_1$, and update $f_{min} = \min\{f_i : i \in P_1\}$ and corresponding $x_{min}$. FIG. 5 shows this process on a two-dimensional example.

Program 150 performs a local search over identified potentially optimal hyper-rectangles (step 304). In an embodiment, program 150 locally searches (e.g., randomized directional search), as detailed in FIG. 8, to calculates and select a point as a representative for each identified potentially optimal hyper-rectangle, as detailed in step 302. Program 150 searches locally and globally by dividing all hyper-rectangles that meet the criteria in Definition 2, as detailed below. A hyper-rectangle $H_i$ is now represented by a triple $(f_i, V_i, \sigma_i)$, where novel notations for $f_i$ and $\sigma_i$ are introduced. In an embodiment, program 150 utilizes a higher quality value $f_i$ returned by a local search as a representative for each hyper-rectangle, and a flatness measurement $\sigma_i$ in the proposed criterion in Definition 2, as detailed below.

In an embodiment, program 150 utilizes a randomized local search algorithm designed for minimizing stepwise function $f(x)$ over a bounded box $B=\{x\in\mathbb{R}^p: a\leq x\leq b\}$. As detailed in the algorithm contained within FIG. 8, program 150 increases the step size when no better solution is discovered in the current iteration, which is motivated from the stepwise landscape of the objective function. In various embodiments, program 150 provides two different options to generate the search directions D: (a) by coordinate strategy, for each axis i, some embodiments of the present invention take two directions $e_i$ and $e_{-i}$ with a probability $w_i$ calculated from variable importance; (b) by random sampling from the unit sphere in $\mathbb{R}^p$. In an embodiment, the first option is more suitable when the discontinuous boundaries are in parallel to the axis, for example, the ensemble tree regression functions. In an embodiment, the second option works for general stepwise functions when the boundaries for each level set is not axis parallel. In various embodiments, program 150 stores the feasible sampled points $x+\delta d$ with associated function values generated during local search in order to update the best function value $f_i$ for each hyper-rectangle $H_i$ for a new partition.

Definition 2: Let $E>0$ be a small positive constant and $f_{min}$ be the current best function value over $\Omega$. Some embodiments of the present invention assume $f_i$ is the best function value over the hyper-rectangle $H_i$. A hyper-rectangle j is said to be potentially optimal if there exists $K>0$ such that:

$$f_j - K^* V_j^* \sigma_j \leq f_i - K^* V_i^* \sigma_i, \forall i \in [m] \quad\quad 5)$$

$$f_j - K^* V_j^* \sigma_j \leq f_{min} - \epsilon |f_{min} - f_{median}| \quad\quad 6)$$

With respect to equations (5) and (6), where $\sigma_j$ quantifies the local variability of the hyper-rectangle j and $f_{median}$ is the median of all the function values in history.

Here, program 150 utilizes the definition for $V_j$ as the same one used above. Equation (5) introduces a new notation $\sigma_j$ to measure the local landscape of the stepwise function. In an embodiment, program 150 replaces $f(c_j)$ by $f_j$, which is computed with the help of local search. The value of $f_j$ generated above is better than capturing the global solution over $H_j$: $f_j \leq f(c_j)$. In Equation (6), in order to eliminated the sensitivity to scaling issue, program 150 replaces $|f_{min}|$ by the difference $|f_{min} - f_{median}|$.

In an embodiment, at the k-ith iteration of program 150, for hyper-rectangle $H_j \in P_k$ with center $c_j$ and diameter $d_j$, program 150 defines the set of neighborhood hyper-rectangles as:

$$N_j = \{i \in I_k : \|c_i - c_j\| \leq \lambda d_j\} \quad\quad 7)$$

With respect to equation (7), for some $\lambda>0$; for example, program 150 sets $\lambda=2$. Then, program 150 further divides $N_j \subset I_k$ into two disjoint subsets $N_j^I$ and $N_j^E$ such that $N_j^I = \{i \in N_j : f_i \neq f_j\}$ and $N_j^E = \{i \in N_j : f_i \neq f_j\}$.

In an embodiment, the local variability estimator for hyper-rectangle $H_j$ is defined as:

$$\sigma_j = \max\left\{\frac{|N_j^I|}{|N_j|}, \epsilon_v\right\} \in [\epsilon_v, 1] \quad\quad 8)$$

With respect to equation (8), where $\epsilon_v$ is a small positive number which prevents $\sigma_j=0$. In an embodiment, program 150 sets $\lambda=1.5$ and $\epsilon_v=10^{-8}$ as default. In various embodiments, program 150 defines $\sigma_j$ as such: for each hyper-rectangle $H_j$, larger $\sigma_j$ indicates that there are more different function values in the neighborhood of the center $c_j$, where requires more local exploration. In embodiment, program 150 includes the hyper-rectangle into the set of potentially optimal hyper-rectangles. In a further embodiment, program 150 calculates and includes the local variability of the hyper-rectangle helping to balance the local exploration and global search. In various embodiments, larger local variability indicates different function values in the neighborhood of center of the hyper-rectangle, requiring more local searching. In an additional embodiment, program 150 utilizes $|f_{min} - f_{median}|$ to remove sensitivity to the linear and additive scaling and improve clustering of sample points near optimal solutions. Further, $f_i$ may be different from $f(c_i)$ i.e., $f_i \leq f(c_i)$.

Program 150 splits potentially optimal hyper-rectangles (step 306). In an embodiment, responsive to program 150 identifying a hyper-rectangle as potentially optimal program 150 divides said hyper-rectangle into smaller hyper-rectangles utilizing the completed local search as detailed in step 304. In an embodiment, program 150 divides one or more hyper-rectangles in the identified set of optimal hyper-rectangles into a plurality of smaller hyper-rectangles based on each calculated point In an embodiment, program 150 considers the length and the variable importance measure of each dimension of each hyper-rectangle. In the tree ensemble regression optimization embodiment, program 150 obtains a variable importance indicating the relative importance of different features. In general, the variable importance relates to a significant function value change if program 150 moves (e.g., searches) along this direction, and also the number of discontinuous points along the coordinate. As a result, program 150 splits along the direction with higher variable importance. Formally, let $w=(w_1, \ldots, w_p) \in \mathbb{R}_+^p$ be the normal variable importance with $\|w\|_1=1$ and the length of the hyper-rectangle be $l=(l_1, \ldots, l_p) \in \mathbb{R}_+^p$, then program 150 defines:

$$v=(v_1, \ldots, v_p)=(w_1 l_1, \ldots, w_p l_p) \quad\quad 9)$$

With respect to equation (9), as the relative importance of all coordinates for the selected hyper-rectangle. In an embodiment, program 150 selects the coordinate with the highest value $v_i$ to divide the hyper-rectangle into thirds. If no variable importance measure is provided, $$w = \left(\frac{1}{p}, \ldots, \frac{1}{p}\right) \in \mathbb{R}_+^p.$$

In an embodiment, program 150 divides one or more hyper-rectangles by splitting the dimensions with the longest length. In various embodiments, when prior information on the relative importance for different decision variables is available, program 150 splits the potentially optimal hyper-rectangles along the dimension with higher relative variable importance.

Further Comments and/or Embodiments

Some embodiments of the present invention recognize the following facts, potential problems, and/or potential areas for improvement with respect to the current state of the art.

1 Introduction

Some embodiments of the present invention consider a class of black-box deterministic optimization problems, which often arise in machine learning:

$$\min f(x), x \in \Omega \quad (10)$$

With respect to equation (10), $\Omega$ is a bounded hyper-rectangle, i.e., $\Omega = \{x \in \mathbb{R}^p : l \leq x \leq u\}$ for some given $l$, $u \in \mathbb{R}^p$. Some embodiments of the present invention assume that $\Omega = f: \mathbb{R}^P \to \mathbb{R}$ is a stepwise function, whose closed-form formula is unavailable or costly to get and store. Some embodiments of the present invention will point out two motivating important applications in the next section that fit into this framework: hyperparameter tuning for classification and optimizing tree ensemble regression.

Some embodiments of the present invention often observe in many applications that computing the gradient and the Hessian of the objective function of is not possible. Even though, if some embodiments of the present invention assume that they are accessible and computable, but due to the constant and discontinuous structure of a stepwise function, gradients are either zero or undefined. Hence, there is no useful derivative information available to do gradient-based optimization for solving. Some embodiments of the present invention propose a spatial-partitioning derivative-free optimization (DFO) algorithm for the problem, in which $f$ is viewed as a black-box function whose function value can only be evaluated point-wisely. The key ingredient in the present invention is the selection of hyper-rectangles to do partition and sample new points. Some embodiments of the present invention do not attempt to compute approximate gradients or build a surrogate of the objective function as in many common methods.

Derivative-free optimization has a long history and can be traced back to deterministic direct-search (DDS). Subsequently, many variants of DDS have been proposed, including the generalized pattern-search (GPS) method, DIRECT, and the mesh adaptive direct search (MADS) method. In addition, evolution strategy is a class of DFO that are heuristic search procedures inspired by natural evolution, including the differential evolution (DE) and the covariance matrix adaptation evolution strategy (CMA-ES). Another important class of DFO is the local model-based methods in which the updates are based primarily on the predictions of a model that serves as a surrogate of the objective function or of a related merit function. For instance, RBFOpt utilizes the radial basis function as the surrogate model. Recently, Bayesian Optimization (BO) are widely applied in hyper-parameter tuning for machine learning models.

Some embodiments of the present invention propose a new DFO algorithm based on the idea of the well-known DIRECT algorithm for solving global optimization problems with box constraint. The name DIRECT comes from the shortening of the phrase "DIviding RECTangles", which describes the way the algorithm partitions the feasible domain by a number of hyper-rectangles in order to move towards the optimum. An appealing feature of DIRECT is that it is insensitive to discontinuities and does not rely on gradient estimate. These characteristics are nicely suitable for a stepwise function. In the literature, a number of variants of DIRECT algorithms have been proposed for a general objective function a very few of them have been successful to exploit the problem structure. For example, some have introduced an efficient modification of DIRECT to optimize a symmetric function by including an ordered set in the hyper-rectangle dividing step. Some embodiments of the present invention propose a DIRECT-type algorithm to utilize the stepwise structure of the objective function. Compared with the accuracy original DIRECT algorithm and other variants, the proposed StepDIRECT differs from them in the following aspects. Some embodiments of the present invention provide a new criterion for calculating and selecting potentially optimal hyper-rectangles using the local variability and the best function value. Some embodiments of the present invention propose a new stochastic local search algorithm specially designed for stepwise functions. As a result, StepDIRECT is a stochastic sampling global optimization algorithm, some embodiments of the present invention introduce a stochastic feature to the algorithm in order to escape from a local minimum. When prior information on the relative importance for different decision variables is available, some embodiments of the present invention split the potentially optimal hyper-rectangles along the dimension with higher relative variable importance.

2 Motivating Examples

To fully see the importance of the proposed algorithm, some embodiments of the present invention show two concrete examples.

Hyper-parameter tuning (HPT) for classification: In machine learning models, some embodiments of the present invention often need to choose a number of hyper-parameters to get a high prediction accuracy for unseen samples. For example, in training $f1$-regularized logistic regression classifier some embodiments of the present invention can tune the sparsity parameter. To have a good generalization property for new instances which the model has not yet seen, some embodiments of the present invention split the entire dataset into three subsets: training data, validation data, and testing data. For a given set of hyper-parameters, some embodiments of the present invention train the model on the training data, then evaluate the model performance on the validation data. Some commonly used metrics include accuracy, precision, recall, F1-score, and AUC (Area Under the Curve). The goal is to tune hyper-parameters for the model to maximize the performance on the validation data. The task can be formulated as a black-box optimization problem.

First, some embodiments of the present invention start with a binary classifier. Suppose that some embodiments of the present invention are given the m training samples $\{(x_1, y_1), \ldots, (x_m, y_m)\}$ and n validation samples $\{(x_1, y_1), \ldots, (x_n, y_n)\}$ where $x_i \in \mathbb{R}^d$ and $y_i \in \{\pm 1\}$. For a fixed set of model parameters $\lambda \in \mathbb{R}^p$, a classification model $h(\bullet; \lambda): \mathbb{R}^d \to 1$ has been learned based on the training data. When the performance measure is accuracy, the HPT problem is to determine $\lambda$ that maximizes:

$$F_{accuracy}(\lambda) = \frac{1}{n} \sum_{i=1}^{n} I(h(x_i; \lambda) = y_i) \quad 11)$$

With respect to equation (11), $I(\bullet)$ is the indicator function and $(x_i, y_i)$ is from the validation data. It is plain to see that $$F_{accuracy}(\lambda) \in \left\{0, \frac{1}{n}, \ldots, \frac{n-1}{n}, 1\right\}$$

for any $\lambda$; hence this function is a stepwise function. The target function for other metrics can also be interpreted as a stepwise function. The observations still hold true for a multi-label classifier. The hyperparameters for a model can be categorical, discrete, or continuous. Some embodiments of the present invention particularly focus on developing a DFO method for tuning purely continuous parameters.

Tree ensemble regression optimization: A common approach for the decision-making problem-based data-driven tools is to build a pipeline from historical data, to predictive model, to decisions. A two-stage solution is often used, where the prediction and the optimization are carried out in a separate manner. First, a machine learning model is trained to learn the under-lying relationship between the controllable variables and the outcomes. Second, the trained model is embedded in the downstream optimization to produce a decision. Some embodiments of the present invention assume that the regression model estimated from the data is a good representation of the complex relationship. Some embodiments of the present invention consider optimizing a tree ensemble model such as random forests and boosting trees.

The ensemble method combines predictions from multiple decision trees. A decision tree uses a tree-like structure to predict the outcome for an input feature vector x. The regression trees assume a model of the form:

$$f_t(x) = \sum_{i=1}^{M} c_{t,i} \cdot I(x \in R_{t,i}) \qquad 12)$$

With respect to equation (12), where $R_{t,i}, \ldots, R_{t,m}$ represent a partition of feature space. It is easy to see that $f_t(x)$ is a stepwise function. In practice, individual decision trees often suffer from high variance predictions and poor out-of-sample predictive accuracy and overfit with data if there is no restriction in size. By using the bagging techniques, the tree ensemble regression function outputs predictions by taking the weighted sum of multiple decision trees as:

$$f(x) = \sum_{t=1}^{T} \lambda_t f_t(x) \qquad 13)$$

With respect to equation (13), where $\lambda_t$ is the weight for the decision tree $f_t(x)$. Some embodiments of the present invention demonstrate that $f_t(x)$ is constant over a subregion $\mathbb{R}_{t,i}$; hence $f(x)$ is a stepwise function. Some embodiments of the present invention note that for this type of regressions, some embodiments may also get additional information about the function such as variable importance from random forests.

3 STEPDIRECT FOR STEPWISE FUNCTION

The StepDIRECT algorithm begins the optimization by transforming the domain of the problem linearly into the unit hyper-cube. Therefore, some embodiments of the present invention assume that:

$$\Omega = \{X \in \mathbb{R}^p : 0 \leq x_i \leq 1\} \qquad 14)$$

In each iteration, StepDIRECT consists of three main steps. First, some embodiments of the present invention identify a set of potentially optimal hyper-rectangles based on a new criterion. Some embodiments of the present invention expect that the sub-regions have a high chance to contain a global optimal solution. The second step is to perform a local search over the potentially optimal hyper-rectangles. Thirdly, some embodiments of the present invention divide the selected hyper-rectangles into smaller hyper-rectangles.

Some embodiments of the present invention improve over the general DIRECT-type approaches by: 1) using a different heuristic to select which hyper-rectangle to split, which takes into account the local function variability; 2) using a local search (randomized directional search) to choose a high-quality point as a representative for each hyper-rectangle. Both two proposed strategies make use of the stepwise structure of the objective function.

At the k-th iteration, $P_k$ define the set of the current hyper-rectangles associated with the index set $I_k$:

$$P_k = \{H_i : i \in I_k\} \qquad 15)$$

With respect to equation (15), where $H_i = \{x \in \mathbb{R}^p : 0 \leq l_i \leq x \leq u_i \leq 1\}$ is a hyper-rectangle in the partition. The set $C_k$ denotes the set of centers $c_k$ of hyper-rectangles in $P_k$. Denote by $f_i$ the best function value of $f$ over $H_i$ by evaluating at the current sampled points in the sub-regions including its center $c_i$. Some embodiments of the present invention use m to count the number of function evaluations and $f_{eval}^{max}$ is the maximal number of function evaluations. Some embodiments of the present invention present StepDIRECT in Algorithm 1.

3.1 Initialization Step

Some embodiments of the present invention follow the first step of the original DIRECT for initialization. In this step, some embodiments of the present invention start with finding $f_1 = f(c_1)$ and divides the hyper-cube $\Omega$ by evaluating the function values at 2p points $c_1 \pm \delta e_i$, $i \in [p] \triangleq \{1, \ldots, p\}$, where $\delta = 1/3$ and $e_i$ is the i-th unit vector. The idea of DIRECT is to select a hyper-rectangle with a small function value in a large search space; hence:

$$s_i = \min\{f(c_1 + \delta e_i), f(c_1 - \delta e_i)\}, i \in [p] \qquad 16)$$

And the dimension with the smallest $s_i$ is partitioned into thirds. By doing so, $c_1 \pm \delta e_i$ are the center of the newly generated hyper-rectangles. Some embodiments of the present invention initialize the sets $P_1$, $I_1$, $C_1$, values $f_i$ for every $i \in P_1$, and update $f_{min} = \min \{f_i : i \in P_1\}$ and corresponding $x_{min}$. FIG. 5 shows this process on a two-dimensional example.

3.2 Potentially Optimal Hyper-Rectangles

In this subsection, some embodiments of the present invention propose a new criterion for StepDIRECT to select the next potentially optimal hyper-rectangles, which should be divided in this iteration. In the original DIRECT algorithm, every hyper-rectangle i is represented by a pair $(f_i, V_i)$, where $f_i$ is the function value estimated ay the center of $H_i$ and $V_i$ is the size of the hyper-rectangle. The criterion to select hyper-rectangles, the so-called potentially optimal hyper-rectangles, for further divided is based on a score computed from $(f_i, V_i)$. A pure local strategy would select the hyper-rectangle with the smallest value for $f_i$, while a pure global search strategy would choose one of the hyper-rectangles with the biggest size $V_i$ in each iteration. The main idea of the DIRECT algorithm is to balance between the local and global search, which can achieve by using a score weighting the two search strategies: $f_i - K \times V_i$ for some $K > 0$. The potentially optimal hyper-rectangles for DIRECT as defined as follows: Definition 1: Let $E > 0$ be a small positive constant and $f_{min}$ be the current best function value over $\Omega$. Some embodiments of the present invention denote $f_i$ by the function value at the center of the hyper-rectangle. A hyper-rectangle j is said to be potentially optimal if there exists $K > 0$ such that:

$$f_j - K^* V_j \leq f_i - K^* V_i, \forall i \in [m] \qquad 17)$$

$$f_j - K^* V_j \leq f_{min} - \epsilon \qquad 18)$$

With respect to equations (17) and (18), where $V_j$ is one half of the diameter of the hyper-rectangle $H_j$.

An example for identifying these potentially optimal hyper-rectangles by Definition 1 is detailed above. Each dot in a two-dimensional space represents a hyper-rectangle, three red dots with the smallest value for $f_j - K*V_j$ for each K and a significant improvement (i.e., $f_j - K*V_j \leq f_{min} - \epsilon$) are considered as potentially optimal.

The new StepDIRECT searches locally and globally by dividing all hyper-rectangles that meet the criteria in Definition 2. A hyper-rectangle $H_i$ is now represented by a triple $(f_i, V_i, \sigma_i)$, where novel notations for $f_i$ and $\sigma_i$ are introduced. Some embodiments of the present invention use a higher quality value $f_i$ returned by a local search as a representative for each hyper-rectangle, and a flatness measurement $\sigma_i$ in the proposed criterion.

Definition 2: Let $E>0$ be a small positive constant and $f_{min}$ be the current best function value over $\Omega$. Some embodiments of the present invention assume $f_i$ is the best function value over the hyper-rectangle $H_i$. A hyper-rectangle j is said to be potentially optimal if there exists K>0 such that:

$$f_j - K*V_j*\sigma_j \leq f_i - K*V_i*\sigma_i, \forall i \in [m] \quad 19)$$

$$f_j - K*V_j*\sigma_j \leq f_{min} - \epsilon |f_{min} - f_{median}| \quad 20)$$

With respect to equations (19) and (20), where $\sigma_j$ quantifies the local variability of the hyper-rectangle j and $f_{median}$ is the median of all the function values in history.

Here, some embodiments of the present invention use the definition for $V_j$ as the same one used above. Equation (19) introduces a new notation $\sigma_j$ to measure the local landscape of the stepwise function. Furthermore, some embodiments of the present invention replace $f(c_j)$ as in the original DIRECT by $f_j$, which is computed with the help of local search. The value of $f_j$ generated during Steps a and c is better than capturing the global solution over $H_j$: $f_j \leq f(c_j)$. In Equation (20), in order to eliminated the sensitivity to scaling issue, $|f_{min}|$ is replaced by the difference $|f_{min} - f_{median}|$.

Some embodiments of the present invention discuss how to compute $\sigma_j$. At the k-ith iteration of the StepDIRECT algorithm, for hyper-rectangle $H_j \in P_k$ with center $c_j$ and diameter $d_j$, some embodiments of the present invention define its set of neighborhood hyper-rectangles as:

$$N_j = \{i \in I_k : \|c_i - c_j\| \leq \lambda d_j\} \quad 21)$$

With respect to equation (21), for some $\lambda > 0$; for example, some embodiments of the present invention take $\lambda = 2$. Then, $N_j \subset I_k$ can be further divided into two disjoint subsets $N_j^I$ and $N_j^E$ such that $N_j^I = \{i \in N_j : f_i \neq f_j\}$ and $N_j^E = \{i \in N_j : f_i \neq f_j\}$.

The local variability estimator for hyper-rectangle $H_j$ is defined as:

$$\sigma_j = \max\left\{\frac{|N_j^I|}{|N_j|}, \epsilon_v\right\} \in [\epsilon_v, 1] \quad 22)$$

With respect to equation (22), where $\epsilon_v$ is a small positive number which prevents $\sigma_j = 0$. Some embodiments of the present invention set $\lambda = 1.5$ and $\epsilon_v = 10^{-8}$ as default. The meaning of $\sigma_j$ can be interpreted as follows. For each hyper-rectangle $H_j$, larger $\sigma_j$ indicates that there are more different function values in the neighborhood of the center $c_j$, where requires more local exploration. Some embodiments of the present invention include the hyper-rectangle into the set of potentially optimal hyper-rectangles.

By Definition 2, some embodiments of the present invention efficiently find the potentially optimal hyper-rectangles based on the following lemma: Lemma 1, Let $\epsilon > 0$ be the positive constant used in Definition 2 and $f_{min}$ be the current best function value. Let I be the set of all indices of all existing hyper-rectangles and for each $j \in I$, define:

$$I_1 = \{i \in I : V_i \times \sigma_i < V_j \times \sigma_j\} \quad 23)$$
$$I_2 = \{i \in I : V_i \times \sigma_i > V_j \times \sigma_j\}$$
$$I_3 = \{i \in I : V_i \times \sigma_i = V_j \times \sigma_j\}$$

and $$g_2 = \frac{f_i - f_j}{V_i \times \sigma_i - V_j \times \sigma_j}, \forall i \neq j$$

The hyper-rectangle j is potentially optimal if $$f_j \leq f_i, \forall i \in I_3$$

there exists K>0 such that $$\max_{i \in I_1} g_i \leq K \leq \min_{i \in I_2} g_i,$$

and $$\epsilon \leq \frac{f_{min} - f_j}{|f_{min} - f_{median}|} + \frac{V_j \times \sigma_j}{|f_{min} - f_{median}|} \times \min_{i \in I_2} g_i$$

for $f_{min} \neq f_{median}$, or $$f_j \leq V_j \times \sigma_j \times \min_{i \in I_2} g_i$$

for $f_{min} = f_{median}$.

Proof. For $i \in I_3$, the inequality $f_j \leq f_i$ follows directly from equation (19). For $i \in I_1$, some embodiments of the present invention have:

$$K \geq \frac{f_j - f_i}{V_j \times \sigma_j - V_i \times \sigma_i},$$

and for $i \in I_2$, it implies that:

$$K \leq \frac{f_j - f_i}{V_i \times \sigma_i - V_j \times \sigma_j}.$$

Hence, above directly follows from above by taking the maximum over $I_1$ and taking the minimum over $I_2$. When $f_{min} \neq f_{median}$, some embodiments of the present invention:

$$\epsilon \leq \frac{f_{min} - f_j}{|f_{min} - f_{median}|} + K \frac{V_j \times \sigma_j}{|f_{min} - f_{median}|}.$$

The following, $$\epsilon \leq \frac{f_{min} - f_j}{|f_{min} - f_{median}|} + \frac{V_j \times \sigma_j}{|f_{min} - f_{median}|} \times \min_{i \in I_2} g_i,$$

is a consequence of the above inequality by taking $$K = \min_{i \in I_2} \frac{f_j - f_i}{V_i \times \sigma_i - V_j \times \sigma_j}.$$

Similar arguments hold when $f_{min} = f_{median}$. ∎

Some embodiments of the present invention note that Definition 2 differs from the potentially optimal hyper-rectangle definition proposed in Definition 1 in the following aspects: Definition 2 includes the local variability of the hyper-rectangle. For the stepwise function, this quantity helps balance the local exploration and global search. Furthermore, Definition 2 uses $|f_{min} - f_{median}|$ to remove sensitivity to the linear and additive scaling and improve clustering of sample points near optimal solutions. Further, $f_i$ may be different from $f(c_i)$ i.e., $f_i \leq f(c_i)$.

3.3 Dividing Potentially Optimal Hyper-Rectangles

Once a hyper-rectangle has been identified as potentially optimal, StepDIRECT divides this hyper-rectangle into smaller hyper-rectangles. Some embodiments of the present invention consider the length and the variable importance measure of each dimensions. In the tree ensemble regression optimization, some embodiments of the present invention obtain the variable importance which can indicate the relative importance of different features. In general, the variable importance relates to a significant function value change if some embodiments of the present invention move along this direction, and also the number of discontinuous points along the coordinate. As a result, some embodiments of the present invention tend to make more splits along the direction with higher variable importance. Formally, let $w=(w_1, \ldots, w_p) \in \mathbb{R}_+^p$ be the normal variable importance with $\|w\|_1 = 1$ and the length of the hyper-rectangle be $l=(l_1, \ldots, l_p) \in \mathbb{R}_+^p$, then some embodiments of the present invention define:

$$v=(v_1, \ldots, v_p)=(w_1 l_1, \ldots, w_1 l_p) \quad (24)$$

With respect to equation (24), as the relative importance of all coordinates for the selected hyper-rectangle. Some embodiments of the present invention choose the coordinate with the highest value vi to divide the hyper-rectangle into thirds. If no variable importance measure is provided, $$w = \left(\frac{1}{p}, \ldots, \frac{1}{p}\right) \in \mathbb{R}_+^p.$$

The dividing procedure is the same as the original DIRECT by splitting the dimensions with the longest length.

3.4 Local Search for Stepwise Function

In this subsection, some embodiments of the present invention introduce a randomized local search algorithm designed for minimizing stepwise function $f(x)$ over a bounded box $B=\{x \in \mathbb{R}^p: a \leq x \leq b\}$. Different from the classical trust-region method, Algorithm 2, as detailed in FIG. 8, will increase the step size when no better solution is discovered in the current iteration. This change is motivated from the stepwise landscape of the objective function.

Referring to FIG. 8, some embodiments of the present invention provide two different options to generate the search directions D: (a) by coordinate strategy, for each axis i, some embodiments of the present invention take two directions $e_i$ and $e_{-i}$ with a probability $w_i$ calculated from variable importance; (b) by random sampling from the unit sphere in $\mathbb{R}^p$.

The first option is more suitable when the discontinuous boundaries are in parallel to the axis, for example, the ensemble tree regression functions. The second strategy works for general stepwise functions when the boundaries for each level set is not axis parallel. Some embodiments of the present invention store the feasible sampled points $x+\delta d$ with their function values generated during local search in order to update the best function value $f_i$ for each hyper-rectangle $H_i$ for a new partition.

3.5 Global Convergence of StepDIRECT

Some embodiments of the present invention provide the global convergence results for StepDIRECT. Some embodiments of the present invention assume that $$w = \left(\frac{1}{p}, \ldots, \frac{1}{p}\right) \in \mathbb{R}^p$$

for simplicity and the following theorem is still valid as long as $w_j > 0$ for every $j \in [p]$.

Theorem 1. Suppose that $$w = \left(\frac{1}{p}, \ldots, \frac{1}{p}\right) \in \mathbb{R}^p$$

and $f$ is continuous in a neighborhood of a global optimum. Then, StepDIRECT converges to the globally optimal function value for the stepwise function $f$ over the bounded box.

Proof. Recall that the algorithm is initialized with one-unit hyper-cube. By the partition rule, the new rectangles are formed by dividing exiting ones into one thirds on several dimensions. The only possible side lengths for one rectangle are $3^{-k}$, $k=0, 1, 2, \ldots$. Moreover, as we always divide the larger sides, no side of length $3^{-(k+1)}$ can be divided until all of those sides with length $3^{-k}$ have been divided. After r divisions, the hyper-rectangle will have $j=r \% p$ sides of length $3^{-(k+1)}$ and $n-j$ sides of length $3^{-k}$ with $k=(r-j)/p$. Hence, the diameter (the largest distance from one vertex to the other vertex) of the hyper-rectangle is given by:

$$d=[j3^{-2(k+1)}+(n-j)3^{-2k}]^{0.5},$$

and the volume is $V=3^{-(nk+j)}=3^{-r}$. As the number of division approaches $\infty$, both the diameter d and the volume V converge to 0.

At the t-th iteration, let $r_t$ be the fewest number of divisions undergone by any rectangle. At the t-th iteration, let $r_t$ be the fewest number of divisions undergone by any rectangle. Then, these rectangles would have the largest volume. Some embodiments of the present invention claim that:

$$\lim_{t \to \infty} r_t = \infty. \quad (26)$$

Some embodiments of the present invention show this by contradiction. If $$\lim_{t \to \infty} r_t$$

is bounded with limitation r, some embodiments define the following nonempty set:

$$I_r = \{i : V_i = 3^{-r}\} \qquad (27)$$

Some embodiments of the present invention choose hyper-rectangle $j \in J := \mathrm{argmax}_i\{V_i \times o_i\}$ with the best function value $f_j$ over the hyper-rectangle $H_j$. By the update rule, this rectangle will be potentially optimal as the conditions in Definition 2 are fulfilled with $K > \max\{K_1, K_2\}$, where:

$$K_1 = \frac{f_j - f_{min} + \epsilon|f_{min} - f_{median}|}{V_j \times \sigma_j}, \qquad (28)$$

$$K_2 = \max\left\{\frac{f_j - f_i}{V_j \times \sigma_j - V_i \times \sigma_i} : V_j \times \sigma_j \neq V_i \times \sigma_i\right\}.$$

If $j \in I_r$, it follows that $|I_r|$ decreases by 1. Otherwise, a series of new hyper-rectangles will be generated with volumes no greater than $$\frac{V_j}{3}.$$

Some embodiments of the present invention repeat the above process infinite times. Notice that the variability $\sigma_j$ is bounded within $[\epsilon_v, 1]$. Within finite time of iterations, at least one hyper-rectangle $j \in I_r$ will be selected. It follows that $I_r$ would eventually diminish to an empty set. This contradiction proves that $$\lim_{t \to \infty} r_t = \infty.$$

As a result, the points generated by StepDIRECT will be dense in the original rectangle $\Omega$ and the global convergence directly follows form the continuity assumption.

4 NUMERICAL EXPERIMENTS

In this section, some embodiments of the present invention test the performance of StepDIRECT algorithm on two problems: optimization for random forests regression function and hyper-parameter tuning for classification. As some embodiments of the present invention have explained, both need to minimize a stepwise target function. Some of embodiments of the present invention denote StepDIRECT-0 by a variant of StepDIRECT when some embodiments of the present invention skip Local Search in FIG. 4.

4.1 Optimization for Random Forests Regression Function

Some embodiments of the present invention consider the minimization for Random Forests regression function over a bounded box constraint. Some embodiments of the present invention used the boston, diabetes, mpg and bodyfat datasets from a machine learning repository. FIG. 9 provides the details of these four data sets.

Some embodiments of the present invention train the random forests regression function on these datasets with 100 trees and using default settings for other parameters in scikit-learn package. For comparison, some embodiments of the present invention run the following optimization algorithms: DIRECT, Differential Evolution (DE), Particle Swarm Optimization (PSO), RBFOpt, StepDIRECT-0, and StepDIRECT. In the algorithm detailed in FIG. 4 or both StepDIRECT-0 and StepDIRECT, some embodiments of the present invention set the maximum number of function evaluations $f_{eval}^{max} = 2000$. In FIG. 8, $\delta_{min} = 0.01$, $\delta_{max} = 0.1$, $\theta = 0.1$, $\emptyset = 1.5$, $f_{eval}^{max} = 20$. For all other algorithms, some embodiments of the present invention use the default settings. Some embodiments of the present invention run all algorithms for 20 times and report the mean and standard deviation results for final objective function values (denoted by "objval") and running times in seconds (denoted by "time") in FIG. 10.

For DIRECT and StepDIRECT-0, their outputs do not change for different runs since they are deterministic algorithms. From FIG. 10, some embodiments of the present invention see that the function values returned by StepDIRECT-0 are better than those of the original DIRECT. It illustrates the benefit of the proposed strategy for identifying potentially optimal hyper-rectangles and dividing hyper-rectangles which efficiently exploits the stepwise function structure.

To further see the advantage of local search incorporated into StepDIRECT-0, in StepDIRECT, the local search initializes with the center of potentially optimal hyper-rectangles and runs with search directions D randomly generated by coordinate. Compared with StepDIRECT-0, some embodiments of the present invention notice that the StepDIRECT algorithm achieved lower objective function values. From FIG. 10, StepDIRECT shows the best overall performance in terms of solution quality. By embedding the local search, some embodiments of the present invention can significantly improve the solution quality, and run faster than other baseline methods DE, PSO, and RBFOpt.

4.2 Hyper-Parameter Tuning for Classification

In this subsection, some embodiments of the present invention tune the hyper-parameters for: 1) multi-class classification with one-vs-all strategy and 2) imbalanced binary classification with RBF-kernel SVM.

Some embodiments of the present invention adopt the train-validate-test framework for choosing hyper-parameters by performing the following four standard steps: (1) Partition the total dataset into TRAIN, VAL, and TEST sets with TRAIN $\cup$ VAL $\cup$ TEST $=\{(x_i, y_i)\}_{i=1}^n$; (2) Use the TRAIN set to fit a model for each $\lambda \in \Omega$; (3) Choose the hyper-parameters $\hat{\lambda}$ that maximize the empirical accuracy on the VAL set; (4) Report the empirical accuracy of $\hat{\lambda}$ on the TEST set. For all datasets, some embodiments of the present invention set the ratio among TRAIN, VAL, and TEST partitions as 3:1:1.

4.2.1 Multi-Class Classification

Here, some embodiments of the present invention tune the hyper-parameters for multi-class support vector machines (SVM) and logistic regression (LGR). For multi-class classification problems, some embodiments of the present invention take the "one-vs-all" approach to turn a binary classifier into a multi-class classifier. One-vs-all classification: For each class $m \in \{1, \ldots, N\}$ and a given hyper-parameter $C_m$, the one-vs-all SVM solves the following problem:

$$\min_{\{w^m, b^m\}} \tfrac{1}{2}\|w^m\|^2 + C_m \Sigma_{i=1}^n \xi_i^m$$

$$\text{s.t.} (w^m)^T x_i + b^m \geq 1 - \xi_i^m, \text{ if } y_i = m$$

$(w^m)^T x_i + b^m \geq -1 + \xi_i^m$, if $y_i \neq m$ $\xi_i^m \geq 0, i \in [n]$ 29)

and the class of each point $x_i$ is determined by:

class of $x_i = \mathrm{argmax}_{m \in [N]} \{(w^m)^T x_i + b^m\}$ (30)

Different from many default implementations by taking the same value for $C_m$, $m \in [N]$ some embodiments of the present invention allow them to take different values as the margin between different classes may vary significantly from each other. The one-vs-all logistic regression follows the same approach by replacing equation (30) with the binary logistic regression classifier.

Some embodiments of the present invention search N hyper-parameters $C_m$ for N classifiers in the log space of $\Omega = [10^0, 10^4]^N$. For comparison, some embodiments of the present invention run the following algorithms: Random Search (RS), DIRECT, and Bayesian Optimization (BO). The widely used Grid Search (GS) is not considered here as GS is generally not applicable when the search space dimension is beyond 5. For all algorithms, the budget is 200N in terms of training a base classifier. The results for one-vs-all SVM and one-vs-all LGR are shown in Tables 11 and 12, respectively. Some embodiments of the present invention observe that StepDIRECT gives the best test accuracy for these data sets. Compared with the random search, StepDIRECT improved the test accuracy 0.6-2.0%. Some embodiments of the present invention notice that the original DIRECT algorithm makes little improvement and often gets stuck in the local region until consuming all running budgets while the StepDIRECT algorithm can make consistent progress by balancing the local exploration and global search.

4.2.2 Imbalanced Binary Classification

In the second example, some embodiments of the present invention consider tuning parameters of RBF-SVM with $\ell_2$ regularization $C$, kernel width $Y$, and class weight $c_p$ for the imbalanced binary classification problems. In this setting, some embodiments of the present invention compare the performance of StepDIRECT with DIRECT, RS, BO, and GS in tuning a three-dimensional hyper-parameter $w = (C, C, c_p)$ to achieve a high test accuracy. In experiments, some embodiments of the present invention used 5 binary classification datasets, as shown in FIG. 13.

For all algorithms, the feasible set is chosen as $C \in [10^{-3}, 10^3]$, $C \in [10^{-6}, 10^0]$, and $c_p \in [10^{-2}, 10^2]$ and is searched in the log-scale, as suggested above. For the GS algorithm, some embodiments of the present invention uniformly select 5 candidates for each parameter. For fair comparison, some embodiments of the present invention set the budget as 125 number of function evaluations for all algorithms, FIG. 14 provides the test accuracies in the experiment.

5 CONCLUSION

Some embodiments of the present invention have proposed the StepDIRECT algorithm for solving the black-box stepwise function, which can exploit the special problem structure. Some embodiments of the present invention have introduced a new definition to identify the potentially optimal hyper-rectangles and divide the hyper-rectangles. A stochastic local search is embedded to improve solution quality and speed up convergence. The global convergence is proved and numerical results on two practical machine learning problems show the state-the-art-performance of algorithm. In the future, some embodiments of the present invention plan to combine the ideas from StepDIRECT and Bayesian Optimization, and develop practical algorithms for tuning discrete hyper-parameters in machine learning and deep neural network.

FIG. 4 contains exemplary algorithm 400, in accordance with an embodiment of the present invention. Exemplary algorithm 400 illustrates an algorithm detailing the steps of the StepDIRECT algorithm, as detailed in the flowchart of FIG. 3.

FIG. 5 contains example embodiment 500, an example embodiment of the steps of flowchart 300, in accordance with an embodiment of the present invention. Example embodiment 500 illustrates a generalized hyper-rectangle division into 5 smaller hyper-rectangles, each with a calculated center point (i.e., $C_1, \ldots, C_5$).

Figure 6:
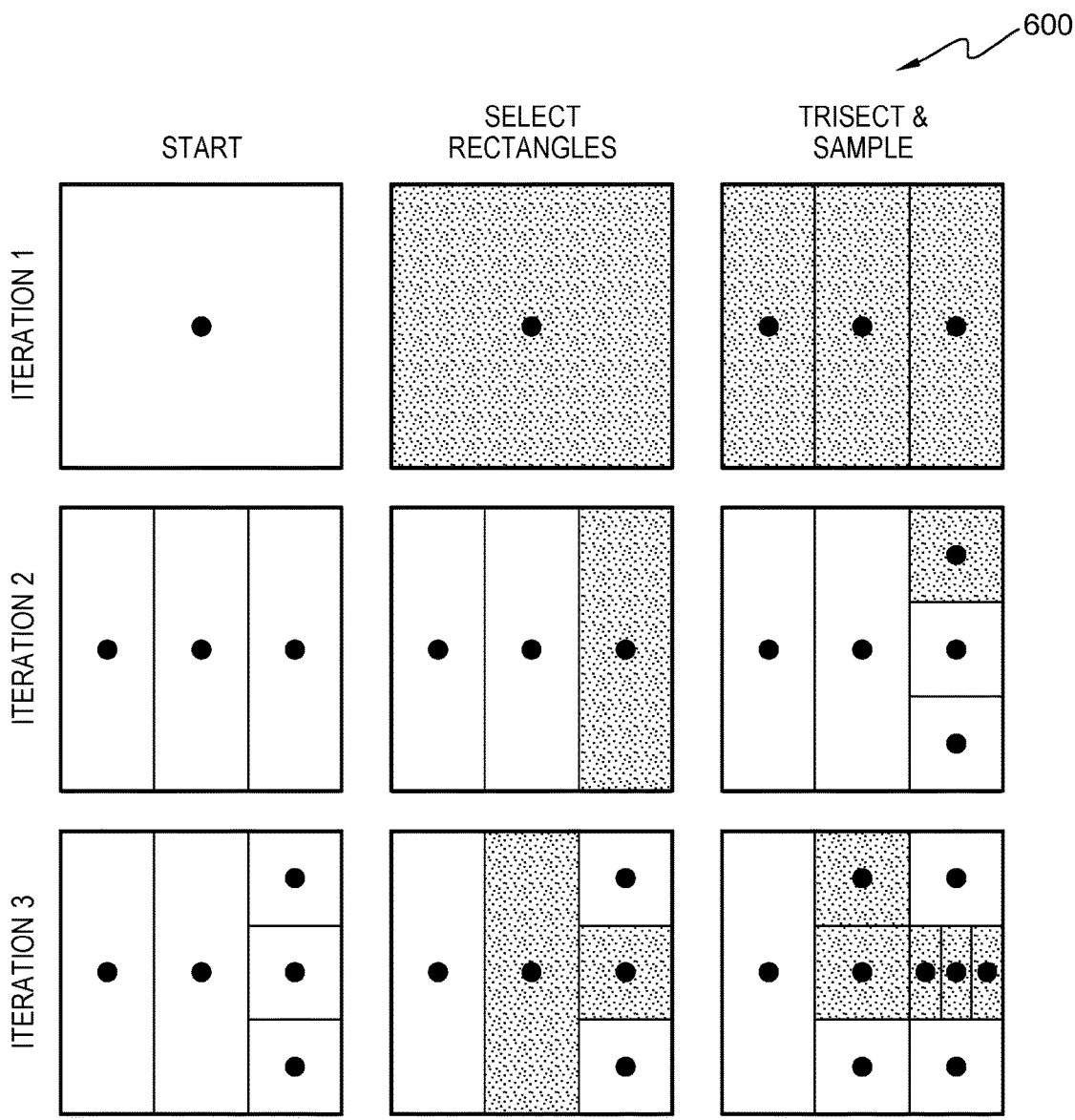
FIG. 6 is an example embodiment of the steps of flowchart 300, in accordance with an embodiment of the present invention.

FIG. 6 contains example embodiment 600, an example embodiment of the steps of flowchart 300, in accordance with an embodiment of the present invention. Example embodiment 600 continues from the example embodiment in FIG. 5 and demonstrates multiple iterations of hyper-rectangle dividing.

Figure 7:
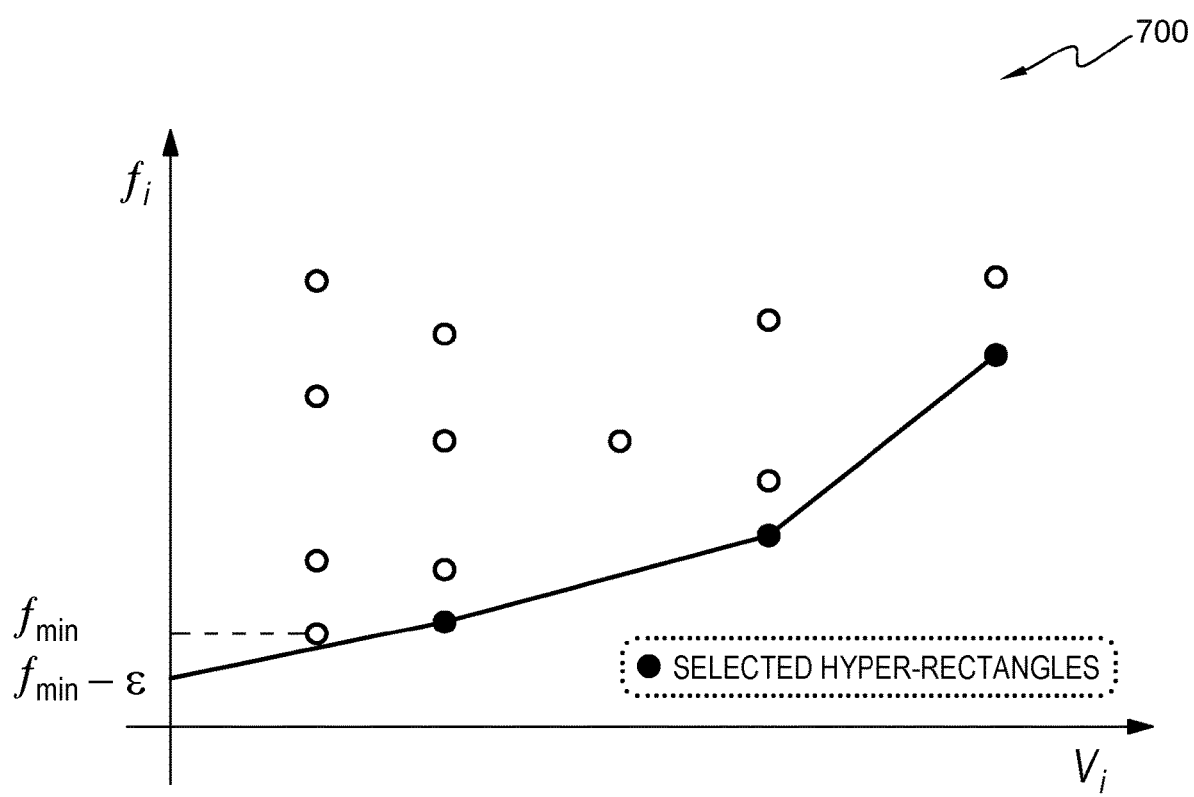
FIG. 7 is an exemplary chart, in accordance with an embodiment of the present invention.

FIG. 7 contains exemplary chart 700, in accordance with an embodiment of the present invention. Exemplary chart 700 details an exemplary chart containing a plurality of divided hyper-rectangles where program 150 selected hyper-rectangles with the lowest $f_{min}$ in each iteration.

FIG. 8 contains exemplary algorithm 800, in accordance with an embodiment of the present invention. Exemplary algorithm 800 illustrates Algorithm 2, detailing the steps of a local search, as detailed in the flowchart of FIG. 3, specifically step 304.

FIG. 9 contains exemplary table 900, in accordance with an embodiment of the present invention. Exemplary table 900 contains an exemplary table containing 4 datasets from multipole online machine learning datasets. FIG. 9 contains datasets containing data regarding boston (i.e., 506 samples and 13 features), diabetes (i.e., 768 samples and 8 features), mpg (i.e., 234 samples and 11 features), and bodyfat (i.e., 252 and 14 features).

FIG. 10 contains exemplary table 1000, in accordance with an embodiment of the present invention. Exemplary table 1000 illustrates a plurality of experiments utilizing random forest regression with 100 trees and a plurality of optimization algorithms (i.e., algorithms ran 20 times), such as DIRECT, DE, PSO, RBFOpt, StepDIRECT-0, and StepDIRECT. Exemplary table 1000 depicts mean and standard deviation results for final objective function values (denoted by "objval") and running times in seconds (denoted by "time"). Exemplary table 1000 illustrates that function values returned by StepDIRECT are significantly enhanced as compared to each algorithm for each training dataset. For example, StepDIRECT achieved an OBJVAL of 28.35 with the boston dataset, an OBJVAL of 56.68 with the diabetes dataset, and an OBJVAL of 1.26 with the bodyfat dataset as compared to DIRECT (i.e., second most accurate algorithm) with respective OBJVALs of 28.40, 69.71, and 1.29, where lower OBJVALs are better than higher OBJVALs. In exemplary table 1000, StepDIRECT shows the best overall performance in terms of solution quality.

FIG. 11 contains exemplary table 1100, in accordance with an embodiment of the present invention. Exemplary table 1100 depicts a plurality of experimental results utilizing synthetic, PenDigits, and MNIST datasets and a plurality of optimization algorithms (i.e., RS, DIRECT, StepDIRECT, BO) with a one-vs-all SVM. Exemplary table 1100 illustrates that StepDIRECT achieved an accuracy of 76.85% with the synthetic dataset, 95.8% with the PenDigits dataset, and 93.4% with the MNIST dataset as compared to DIRECT (i.e., second most accurate algorithm) with respective accuracies of 75.25%, 94.2%, and 91.8%. Exemplary table 1100 demonstrates that StepDIRECT outperforms (e.g., more accurate) each optimization algorithm in each dataset.

FIG. 12 contains exemplary table 1200, in accordance with an embodiment of the present invention. Exemplary table 1200 depicts a plurality of experimental results utilizing synthetic, PenDigits, and MNIST datasets and a plurality of optimization algorithms (i.e., RS, DIRECT, StepDIRECT, BO) with a one-vs-all logistic regression. Exemplary table 1100 illustrates that StepDIRECT achieved an accuracy of 75.5% with the synthetic dataset, 96.8% with the PenDigits dataset, and 92.7% with the MNIST dataset as compared to DIRECT (i.e., second most accurate algorithm) with respective accuracies of 75.25%, 95%, and 91.8%. Exemplary table 1200 demonstrates that StepDIRECT outperforms (e.g., more accurate) each optimization algorithm in each dataset.

FIG. 13 contains exemplary table 1300, in accordance with an embodiment of the present invention. Exemplary table 1300 depicts a plurality of dataset statistics such as number of features (i.e., p), number of samples (i.e., n), and class distribution ratio ($n_-$, $n_+$). For example, the fourclass dataset has 2 features, 862 samples, and a 1.8078 ratio.

FIG. 14 contains exemplary table 1400, in accordance with an embodiment of the present invention. Exemplary table 1400 demonstrates the results of a plurality of experiments that sets a computational budget at 125 function evaluations for all algorithms and provides the test accuracies for the experiment. Exemplary table 1400 utilizes 5 binary classification datasets (i.e., RS, GS, DIRECT, StepDIRECT, BO). Exemplary table 1400 depicts that StepDIRECT achieved an accuracy of 81.8% with the diabetes dataset, 100% with the fourclass dataset, 81.5% with the german dataset, 84.3% with the SV MGUIDE3 dataset, and 98.2% with the IJCNN1 dataset as compared to DIRECT with respective accuracies of 79.2%, 100%, 80.5%, 84.3%, and 98.2%. Exemplary table 1400 demonstrates that StepDIRECT outperforms or at least is at effective as DIRECT with each dataset.

Figure 15:
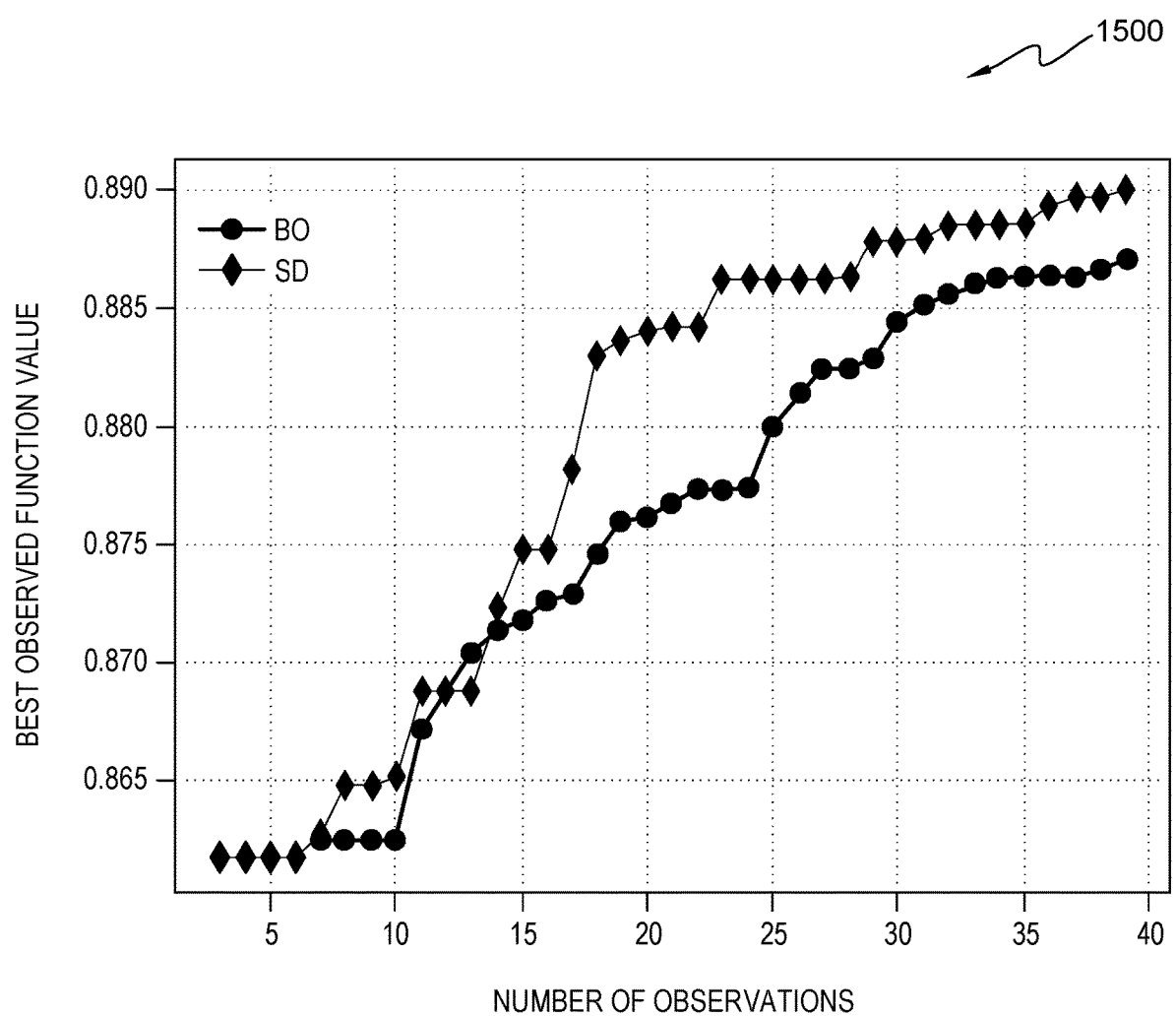
FIG. 15 is an exemplary chart, in accordance with an embodiment of the present invention.

FIG. 15 contains exemplary chart 1500, in accordance with an embodiment of the present invention. Exemplary chart 1500 illustrates the advantage of StepDIRECT (denoted by "SD") over Bayesian Optimization (denoted by "BO"), in terms of best observed function value over number of observations. Exemplary chart 1500 illustrates that StepDIRECT performs better than BO in the majority (e.g., after 14 cases) of observed cases. For example, at 15 observations, StepDIRECT achieves a function value of 0.875 compared to 0.872 for BO.

Figure 16:
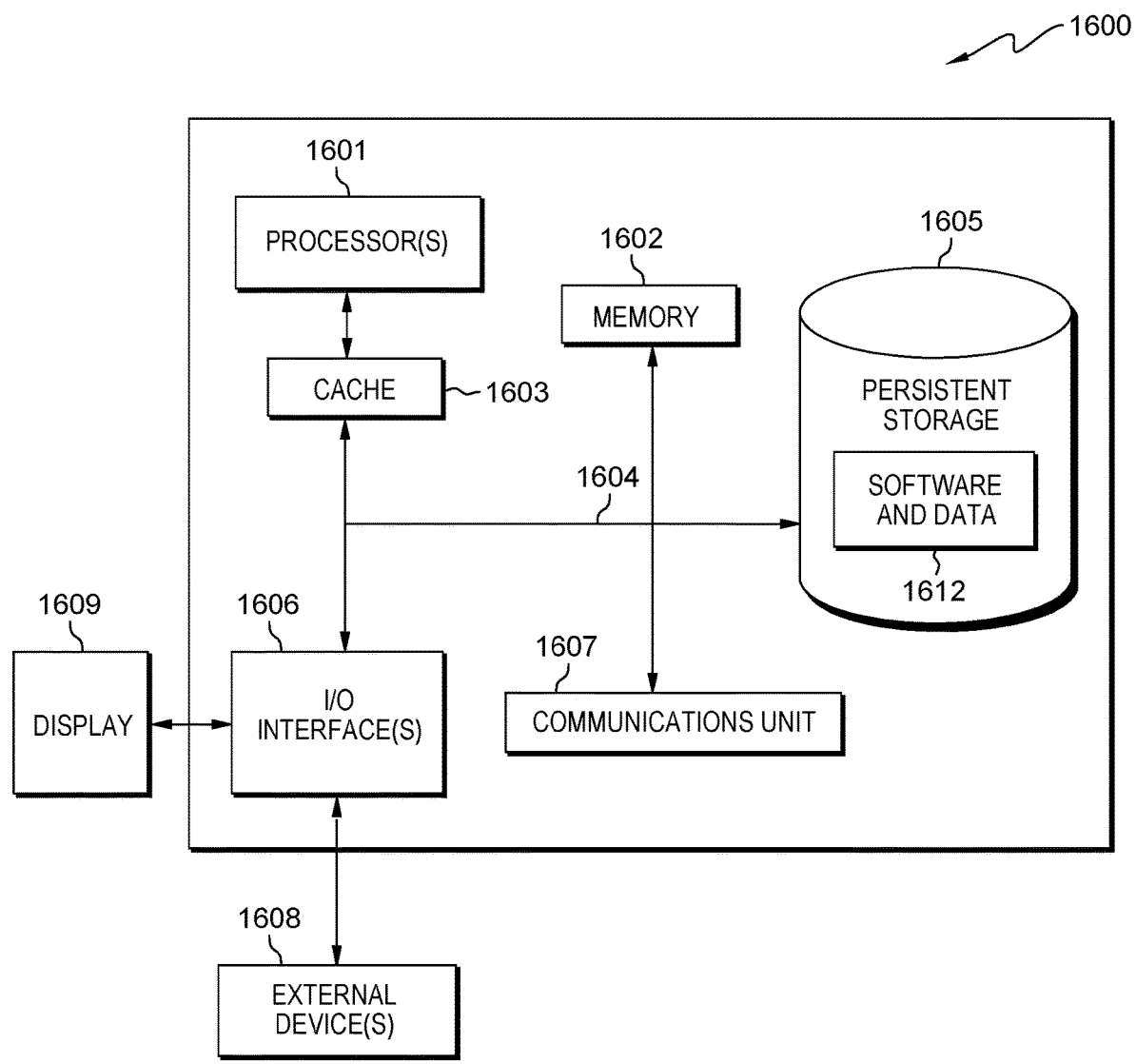
FIG. 16 is a block diagram of components of the server computer, in accordance with an embodiment of the present invention.

FIG. 16 depicts block diagram 1600 illustrating components of server computer 120 in accordance with an illustrative embodiment of the present invention. It should be appreciated that FIG. 16 provides only an illustration of one implementation and does not imply any limitations with regard to the environments in which different embodiments may be implemented. Many modifications to the depicted environment may be made.

Server computer 120 each include communications fabric 1604, which provides communications between cache 1603, memory 1602, persistent storage 1605, communications unit 1607, and input/output (I/O) interface(s) 1606. Communications fabric 1604 can be implemented with any architecture designed for passing data and/or control information between processors (such as microprocessors, communications, and network processors, etc.), system memory, peripheral devices, and any other hardware components within a system. For example, communications fabric 1604 can be implemented with one or more buses or a crossbar switch.

Memory 1602 and persistent storage 1605 are computer readable storage media. In this embodiment, memory 1602 includes random access memory (RAM). In general, memory 1602 can include any suitable volatile or non-volatile computer readable storage media. Cache 1603 is a fast memory that enhances the performance of computer processor(s) 1601 by holding recently accessed data, and data near accessed data, from memory 1602.

Program 150 may be stored in persistent storage 1605 and in memory 1602 for execution by one or more of the respective computer processor(s) 1601 via cache 1603. In an embodiment, persistent storage 1605 includes a magnetic hard disk drive. Alternatively, or in addition to a magnetic hard disk drive, persistent storage 1605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1605 may also be removable. For example, a removable hard drive may be used for persistent storage 1605. Other examples include optical and magnetic disks, thumb drives, and smart cards that are inserted into a drive for transfer onto another computer readable storage medium that is also part of persistent storage 1605. Software and data 1712 can be stored in persistent storage 1605 for access and/or execution by one or more of the respective processors 1601 via cache 1603.

Communications unit 1607, in these examples, provides for communications with other data processing systems or devices. In these examples, communications unit 1607 includes one or more network interface cards. Communications unit 1607 may provide communications through the use of either or both physical and wireless communications links. Program 150 may be downloaded to persistent storage 1605 through communications unit 1607.

I/O interface(s) 1606 allows for input and output of data with other devices that may be connected to server computer 120. For example, I/O interface(s) 1606 may provide a connection to external device(s) 1608, such as a keyboard, a keypad, a touch screen, and/or some other suitable input device. External devices 1608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 1605 via I/O interface(s) 1606. I/O interface(s) 1606 also connect to a display 1609.

Display 1609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
expressing, by one or more computer processors, a hyperparameter tuning process of a model based on a type of model, one or more dimensions of a training dataset, associated loss function of the model, and associated computational constraints of the model, comprising:
identifying, by one or more computer processors, a set of optimal hyper-rectangles based on a calculated $\sigma_j$ and a calculated best function value;
calculating, by one or more computer processors, a point as a representative for each identified potentially optimal hyper-rectangle by locally searching over the identified set of potentially optimal hyper-rectangles;
dividing, by one or more computer processors, one or more hyper-rectangles in the identified set of optimal hyper-rectangles into a plurality of smaller hyper-rectangles based on each calculated point;
calculating, by one or more computer processors, one or more optimal hyperparameters utilizing a globally converged hyper-rectangle from the plurality of smaller hyper-rectangles; and
classifying, by one or more computer processors, one or more unknown datapoints utilizing the model associated with tuned hyperparameters.

2. The computer-implemented method of claim 1, wherein dividing one or more hyper-rectangles in the identified set of optimal hyper-rectangles into the plurality of smaller hyper-rectangles based on each calculated point, comprises:
dividing, by one or more computer processors, one or more hyper-rectangles by splitting each hyper-rectangle in a direction of higher variable importance until the identified set of optimal hyper-rectangles is an empty set indicating a globally converged hyper-rectangle.

3. The computer-implemented method of claim 2, further comprises:
responsive to available prior information on associated relative importance for different decision variables, dividing, by one or more computer processors, one or more potentially optimal hyper-rectangles along a dimension with a higher relative variable importance.

4. The computer-implemented method of claim 1, wherein calculating the point as the representative for each identified potentially optimal hyper-rectangle by locally searching over the identified set of potentially optimal hyper-rectangles, comprises:
performing, by one or more computer processors, a coordinate strategy, wherein the coordinate strategy consists of a local search for each axis in two directions with a probability calculated from variable importance.

5. The computer-implemented method of claim 1, wherein locally searching over the identified set of potentially optimal hyper-rectangles, comprises:
utilizing, by one or more computer processors, random sampling from a unit sphere.

6. The computer-implemented method of claim 1, wherein a larger local variability indicates different function values in a neighborhood of center of a hyper-rectangle, requiring more local searching.

7. The computer-implemented method of claim 1, wherein the model is a multi-class support vector machine.

8. The computer-implemented method of claim 1, wherein the model is a logistic regression model.

9. A computer program product comprising:
one or more computer readable storage media and program instructions stored on the one or more computer readable storage media, the stored program instructions comprising:
program instructions to express a hyperparameter tuning process of a model based on a type of model, one or more dimensions of a training dataset, associated loss function of the model, and associated computational constraints of the model, comprise:
program instructions to identify a set of optimal hyper-rectangles based on a calculated $\sigma_j$ land a calculated best function value;
program instructions to calculate a point as a representative for each identified potentially optimal hyper-rectangle by locally searching over the identified set of potentially optimal hyper-rectangles;
program instructions to divide one or more hyper-rectangles in the identified set of optimal hyper-rectangles into a plurality of smaller hyper-rectangles based on each calculated point;
program instructions to calculate one or more optimal hyperparameters utilizing a globally converged hyper-rectangle from the plurality of smaller hyper-rectangles; and
program instructions to classify one or more unknown datapoints utilizing the model associated with tuned hyperparameters.

10. The computer program product of claim 9, wherein the program instructions, to dividing one or more hyper-rectangles in the identified set of optimal hyper-rectangles into the plurality of smaller hyper-rectangles based on each calculated point, comprise:
program instructions to divide or more hyper-rectangles by splitting each hyper-rectangle in a direction of higher variable importance until the identified set of optimal hyper-rectangles is an empty set indicating a globally converged hyper-rectangle.

11. The computer program product of claim 9, wherein the program instructions, stored on the one or more computer readable storage media, further comprise:
program instructions to responsive to available prior information on associated relative importance for different decision variables, dividing, by one or more computer processors, one or more potentially optimal hyper-rectangles along a dimension with a higher relative variable importance.

12. The computer program product of claim 9, wherein the program instructions, to calculate the point as the representative for each identified potentially optimal hyper-rectangle by locally searching over the identified set of potentially optimal hyper-rectangles, comprise:
program instructions to perform a coordinate strategy, wherein the coordinate strategy consists of a local search for each axis in two directions with a probability calculated from variable importance.

13. The computer program product of claim 9, wherein a larger local variability indicates different function values in a neighborhood of center of a hyper-rectangle, requiring more local searching.

14. The computer program product of claim 9, wherein the model is a multi-class support vector machine.

15. A computer system comprising:
one or more computer processors;
one or more computer readable storage media; and
program instructions stored on the computer readable storage media for execution by at least one of the one or more processors, the stored program instructions comprising:
program instructions to express a hyperparameter tuning process of a model based on a type of model, one or more dimensions of a training dataset, associated loss function of the model, and associated computational constraints of the model, comprise:
program instructions to identify a set of optimal hyper-rectangles based on a calculated $\sigma_j$ and a calculated best function value;
program instructions to calculate a point as a representative for each identified potentially optimal hyper-rectangle by locally searching over the identified set of potentially optimal hyper-rectangles;
program instructions to divide one or more hyper-rectangles in the identified set of optimal hyper-rectangles into a plurality of smaller hyper-rectangles based on each calculated point;
program instructions to calculate one or more optimal hyperparameters utilizing a globally converged hyper-rectangle from the plurality of smaller hyper-rectangles; and
program instructions to classify one or more unknown datapoints utilizing the model associated with tuned hyperparameters.

16. The computer system of claim 15, wherein the program instructions, to dividing one or more hyper-rectangles in the identified set of optimal hyper-rectangles into the plurality of smaller hyper-rectangles based on each calculated point, comprise:
program instructions to divide or more hyper-rectangles by splitting each hyper-rectangle in a direction of higher variable importance until the identified set of optimal hyper-rectangles is an empty set indicating a globally converged hyper-rectangle.

17. The computer system of claim 15, wherein the program instructions, stored on the one or more computer readable storage media, further comprise:
program instructions to responsive to available prior information on associated relative importance for different decision variables, dividing, by one or more computer processors, one or more potentially optimal hyper-rectangles along a dimension with a higher relative variable importance.

18. The computer system of claim 15, wherein the program instructions, to calculate the point as the representative for each identified potentially optimal hyper-rectangle by locally searching over the identified set of potentially optimal hyper-rectangles, comprise:
program instructions to perform a coordinate strategy, wherein the coordinate strategy consists of a local search for each axis in two directions with a probability calculated from variable importance.

19. The computer system of claim 15, wherein a larger local variability indicates different function values in a neighborhood of center of a hyper-rectangle, requiring more local searching.

20. The computer system of claim 15, wherein the model is a multi-class support vector machine.

\* \* \* \* \*